US009536475B2

(12) United States Patent
Shin

(10) Patent No.: US 9,536,475 B2
(45) Date of Patent: Jan. 3, 2017

(54) DISPLAY DEVICE HAVING IMPROVED IMAGE REALIZATION AND DRIVING METHOD THEREOF

(71) Applicant: SAMSUNG DISPLAY CO., LTD., Yongin-si, Gyeonggi-do (KR)

(72) Inventor: Kwang-Sub Shin, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 612 days.

(21) Appl. No.: 13/730,786

(22) Filed: Dec. 28, 2012

(65) Prior Publication Data

US 2014/0062978 A1 Mar. 6, 2014

(30) Foreign Application Priority Data

Aug. 28, 2012 (KR) ........................ 10-2012-0094492

(51) Int. Cl.
*G06F 3/038* (2013.01)
*G09G 3/32* (2016.01)

(52) U.S. Cl.
CPC .......... *G09G 3/3291* (2013.01); *G09G 3/3233* (2013.01); *G09G 2300/0819* (2013.01); *G09G 2300/0852* (2013.01); *G09G 2310/0216* (2013.01); *G09G 2310/0224* (2013.01); *G09G 2320/0261* (2013.01)

(58) Field of Classification Search
CPC .................................................... G09G 3/3291
USPC .......................................................... 345/204
See application file for complete search history.

(56) References Cited

U.S. PATENT DOCUMENTS

| | | | | |
|---|---|---|---|---|
| 5,619,228 A * | 4/1997 | Doherty | G09G 3/2033 345/693 |
| 2002/0047852 A1* | 4/2002 | Inukai et al. | 345/629 |
| 2009/0201286 A1* | 8/2009 | Hasegawa et al. | 345/214 |
| 2012/0249615 A1* | 10/2012 | Lee | 345/691 |

FOREIGN PATENT DOCUMENTS

| | | |
|---|---|---|
| JP | 2010-271365 A | 12/2010 |
| KR | 10-2011-0013693 | 2/2011 |
| KR | 10-2012-0110413 | 10/2012 |

* cited by examiner

*Primary Examiner* — Jonathan Blancha

(74) *Attorney, Agent, or Firm* — Lewis Roca Rothgerber Christie LLP

(57) ABSTRACT

A display device includes first pixels emitting light in a first field and second pixels emitting light in a second field. The first field includes a first compensation period during which threshold voltages of driving transistors of the first pixels are concurrently compensated, a first scan period during which scan signals corresponding to the first pixels are sequentially transmitted and corresponding data signals are programmed, and first light emission periods during which the first pixels concurrently emit light according to the data signals. The second field includes a second compensation period during which threshold voltages of driving transistors of the second pixels are concurrently compensated, a second scan period during which scan signals corresponding to the second pixels are sequentially transmitted and corresponding data signals are programmed, and second light emission periods during which the second pixels concurrently emit light according to the data signals.

38 Claims, 12 Drawing Sheets

1x1 Dot Weave

DISPLAY DEVICE HAVING IMPROVED IMAGE REALIZATION AND DRIVING METHOD THEREOF

CROSS-REFERENCE TO RELATED APPLICATION

This application claims priority to and the benefit of Korean Patent Application No. 10-2012-0094492 filed in the Korean Intellectual Property Office on Aug. 28, 2012, the entire contents of which are incorporated herein by reference.

BACKGROUND (a) Field

The present invention relates to a display device and a driving method thereof. More particularly, the present invention relates to an active matrix type display device and a driving method thereof.

(b) Description of the Related Art

An OLED display uses high integration and high precision to realize a 3-dimensional stereoscopic image in a large-sized display panel, and accordingly a design of a display panel that can be applied to various driving methods with simple alignment is desired.

The entire pixels are divided into at least two groups during one frame, one frame period is divided into at least two fields, and pixels of a group corresponding to each field emit light.

In general, one frame of a display device includes a scan period for programming image data and a light emission period for light emission according to the programmed image data. In addition, an NTSC type display device displays 60 images per second, and a PAL type display device displays 50 images per second.

Thus, when the frame is divided into at least two fields, each field should include a scan period (data programming period) and a light emission period so that the data programming and light emission should be performed within at least 1/120 of a second. Accordingly, high-speed driving with high driving frequency is used. Such a high-speed driving may cause insufficient data programming and light emission, thereby causing deterioration of image quality.

In addition, although light emissions are alternately driven for each field unit to improve (i.e., to reduce) the image quality deterioration, resolution deterioration may occur in a moving image due to a luminance difference between light emitting pixels in each field.

Therefore, it is desirable to develop a driving method that can prevent or reduce motion artifact due to a luminance difference in fields caused by speed of a moving object in the image.

The above information disclosed in this Background section is only for enhancement of understanding of the background of the invention and therefore it may contain information that does not form the prior art that is already known in this country to a person of ordinary skill in the art.

SUMMARY

Embodiments of the present invention have been made in an effort to provide a vivid moving image by preventing resolution deterioration that may occur due to a driving method in image realization of a display device.

In one embodiment according to the present invention, a display device configured to divide one frame into at least two fields is provided. The display device includes a plurality of first pixels configured to emit light in a first field of the at least two fields and a plurality of second pixels configured to emit light in a second field of the at least two fields. The first field includes a first compensation period during which threshold voltages of driving transistors of the plurality of first pixels are concurrently compensated, a first scan period during which scan signals corresponding to the plurality of first pixels are sequentially transmitted and corresponding data signals are programmed, and at least two first light emission periods during which the plurality of first pixels concurrently emit light according to the programmed data signals. The second field includes a second compensation period during which threshold voltages of driving transistors of the plurality of second pixels are concurrently compensated, a second scan period during which scan signals corresponding to the plurality of second pixels are sequentially transmitted and corresponding data signals are programmed, and at least two second light emission periods during which the plurality of second pixels concurrently emit light according to the programmed data signals.

The at least two first light emission periods may be connection type light emission periods such that they are sequential, or separation type light emission periods such that they are separated by a predetermined time, and the connection type light emission periods and the separation type light emission periods may be repeated during sequential frames.

The predetermined time may include the at least two second light emission periods that are connection type light emission periods.

The at least two second light emission periods may be connection type light emission periods such that they are sequential, or separation type light emission periods such that they are separated by a predetermined time, and the connection type light emission periods and the separation type light emission periods may be repeated during sequential frames.

The predetermined time may include the at least first light emission periods that are connection type light emission periods.

In sequential frames, the at least two first light emission periods and the at least two second light emission periods may be alternately arranged such that two connection type light emission periods and separation type light emission periods may be separated by a period that equals at least two light emission periods.

A second scan period of a current frame may be performed for the plurality of second pixels during a first one of the at least two first light emission periods that are separation type light emission periods, and a second scan period of a next frame of the current frame may be performed for the plurality of second pixels during a second one of the at least two first light emission periods that are separation type light emission periods.

A first scan period of a current frame may be performed for the plurality of first pixels during a first one of the at least two second light emission periods that are separation type light emission periods, and a first scan period of a next frame of the current frame may be performed for the plurality of first pixels during a second one of the at least two second light emission periods that are separation type light emission periods.

The at least two first light emission periods and the at least two second light emission periods may be not overlapped with each other.

The display device may further include: a data driver configured to generate a plurality of data signals of the plurality of first and second pixels and to transmit the generated data signals; a scan driver configured to generate a plurality of scan signals that activate driving of the plurality of first and second pixels and to transmit the generated scan signals; and a power controller configured to control power source voltages supplied to the plurality of first pixels and the plurality of second pixels.

The plurality of first pixels may include a plurality of first pixel rows of the first pixels arranged along a first direction and the plurality of second pixels may include a plurality of second pixel rows of the second pixels arranged along the first direction, and the plurality of first pixel rows and the plurality of second pixel rows may be alternately arranged along a second direction that is perpendicular to the first direction.

The plurality of first pixels and the plurality of second pixels may be alternately arranged pixel-by-pixel along a first direction and a second direction that is perpendicular to the first direction.

The display device may further include a compensation control signal unit configured to generate a compensation control signal having an on-voltage level of a compensation transistor included in each of the plurality of first pixels and the plurality of second pixels during the first compensation period and the second compensation period.

The scan signals respectively transmitted to the plurality of first pixels and the plurality of second pixels during the first and second compensation periods may be transmitted at an on-voltage level of a switching transistor included in each of the plurality of first pixels and the plurality of second pixels.

A voltage level of a first power source voltage supplied to the plurality of first pixels during the at least two first light emission periods may be different from a voltage level of the first power source voltage supplied during other periods, excluding the at least two first light emission periods, and may be higher than a voltage level of a second power source voltage supplied to a cathode of an organic light emitting diode of each of the plurality of first pixels.

A voltage level of a third power source voltage supplied to the plurality of second pixels during the at least two second light emission periods may be different from a voltage level of the third power source voltage supplied during other periods, excluding the at least two second light emission periods, and may be higher than a voltage level of a fourth power source voltage supplied to a cathode of an organic light emitting diode of each of the plurality of second pixels.

The first field may further include a first reset period for resetting an anode voltage of an organic light emitting diode of each of the plurality of first pixels, and the second field may further include a second reset period for resetting an anode voltage of an organic light emitting diode of each of the plurality of second pixels.

A first power source voltage transmitted to the plurality of first pixels during the first reset period may be lower than a second power source voltage, and a third power source voltage transmitted to the plurality of second pixels during the second reset period may be lower than a fourth power source voltage.

Voltages of the data signals supplied to the plurality of first pixels during the first reset period may have a level that makes an anode voltage reset to the first power source voltage supplied to the plurality of first pixels by a current flowing to a driving transistor of each of the plurality of first pixels, and voltages of the data signals supplied to the plurality of second pixels during the second reset period may have a level that makes an anode voltage reset to the third power source voltage supplied to the plurality of second pixels by a current flowing to a driving transistor of each of the plurality of second pixels.

In another embodiment according to the present invention, a method for driving a display device dividing one frame into at least two fields, is provided. The display device includes a plurality of first pixels emitting light in a first field and a plurality of second pixels emitting light in a second field. The method includes: transmitting a plurality of first field data signals to the plurality of first pixels during a first scan period; concurrently light emitting the plurality of first pixels during at least two first light emission periods according to the plurality of the first field data signals; transmitting a plurality of second field data signals to the plurality of second pixels during a second scan period; and concurrently light emitting the plurality of second pixels during at least two second light emission periods according to the plurality of second field data signals. The first field that includes the first scan period and the at least two first light emission periods, and the second field that includes the second scan period and the at least two second light emission periods, are temporally distinct from each other.

The at least two first light emission periods of the first field and the at least two second light emission periods of the second field may not overlap each other.

The at least two first light emission periods may be connection type light emission periods such that they are sequential, or separation type light emission periods such that they are separated from each other by a predetermined time, and the connection type light emission periods and the separation type light emission periods may be repeated during sequential frames.

The predetermined time may equal a period that corresponds to the sum of the at least two second light emission periods.

The at least two second light emission periods may be connection type light emission periods such that they are sequential, or separation type light emission periods such that they are separated from each other by a predetermined time, and the connection type light emission periods and the separation type light emission periods may be repeated during sequential frames.

The predetermined time may equal a period that corresponds to the sum of the at least two first light emission periods.

The at least two first light emission periods and the at least two second light emission periods in sequential frames may be alternately arranged such that connection type light emission periods and separation type light emission periods that are separated by a period corresponding to the sum of at least two light emission periods are alternately arranged.

A first one of the at least two first light emission periods may be equal to or shorter than the second scan period for the plurality of second pixels, and a second one of the at least two first light emission periods may be equal to or shorter than the second scan period of a next frame for the plurality of second pixels.

A first one of the at least two second light emission periods may be equal to or shorter than the first scan period for the plurality of first pixels, and a second one of the at least two second light emission periods may be equal to or shorter than the first scan period of a next frame for the plurality of first pixels.

A first period that is a period from a termination time point of the first scan period to a start time point of the at least two first light emission periods that are connection type light emission periods in a current frame and a second period that is a period from a termination time point of the second scan period to a start time point of the at least two second light emission periods that are connection type light emission periods in a next frame that is adjacent to the current frame may be equivalent to each other.

A third period that is a period from a termination time point of the first scan period to a start time point of the at least two first light emission periods that are separation type light emission periods in a current frame and a fourth period that is a period from a terminal time point of the second scan period to a start time point of the at least two second light emission periods that are separation type light emission periods of a next frame that is adjacent to the current frame may be equivalent to each other.

The third period and the fourth period may equal a period that corresponds to the sum of a reset period during which anode voltages of organic light emitting diodes of the plurality of second pixels are reset and a compensation period during which threshold voltages of driving transistors of the plurality of first pixels and the plurality of second pixels are compensated.

Before the first scan period, the method may further include resetting an anode voltage of an organic light emitting diode of each of the plurality of first pixels and compensating a threshold voltage of a driving transistor of each of the plurality of first pixels and, before the second scan period, resetting an anode voltage of an organic light emitting diode of each of the plurality of second pixels and compensating a threshold voltage of a driving transistor of each of the plurality of second pixels.

In yet another embodiment according to the present invention, a method for driving a display device is provided. The display device includes a plurality of pixels that includes a plurality of organic light emitting diodes and a plurality of driving transistors that control a driving current supplied to each of the plurality of organic light emitting diodes, a first power source voltage, and a second power source voltage, the first and second power source voltages supplying driving voltages to the plurality of pixels. The method includes: during a first field: resetting anode voltages of a plurality of first organic light emitting diodes of a plurality of first pixels included in a first pixel group among the plurality of pixels during a first reset period; compensating threshold voltages of a plurality of first driving transistors of the plurality of first pixels during a first compensation period; transmitting a data signal corresponding to each of the plurality of first driving transistors during a first scan period; and concurrently emitting light from the plurality of first organic light emitting diodes according to a plurality of driving currents controlled by the plurality of first driving transistors during at least two first light emission periods; and during a second field: resetting an anode voltage of each of a plurality of second organic light emitting diodes of a plurality of second pixels included in a second pixel group among the plurality of pixels during a second reset period; compensating a threshold voltage of each of a plurality of second driving transistors of the plurality of second pixels during a second compensation period; transmitting a data signal corresponding to each of the plurality of second driving transistors during a second scan period; and concurrently emitting light from the plurality of second organic light emitting diodes according to a plurality of driving currents controlled by the plurality of second driving transistors during at least two second light emission periods.

A voltage level of the first power source voltage supplied to the plurality of first pixels included in the first pixel group during the at least two first light emission periods may be different from a voltage level of the first power source voltage supplied during other periods excluding the at least two first light emission periods, and a voltage level of the second power source voltage supplied to the plurality of first pixels included in the first pixel group during the first reset period may be different from a voltage level of the second power source voltage during other periods excluding the first reset period.

A voltage level of the first power source voltage supplied to the plurality of second pixels included in the second pixel group during the at least two second light emission periods may be different from a voltage level of the first power source voltage supplied during other periods excluding the at least two second light emission periods, and a voltage level of the second power source voltage supplied to the plurality of second pixels included in the second pixel group during the second reset period may be different from a voltage level of the second power source voltage during other periods excluding the second reset period.

The at least two first light emission periods of the first field and the at least two second light emission periods of the second field may be not overlapped with each other, the at least two first light emission periods and the second reset period may be not overlapped with each other, and the at least two second light emission periods and the first reset period may be not overlapped with each other.

The first power source voltage transmitted to the plurality of first pixels during the first reset period may be lower than the second power source voltage transmitted to the plurality of first pixels, and the first power source voltage transmitted to the plurality of second pixels during the second reset period may be lower than the second power source voltage transmitted to the plurality of second pixels.

A voltage of a data signal supplied to the plurality of first pixels during the first reset period may have a level that makes an anode voltage reset to the first power source voltage supplied to the plurality of first pixels by a current flowing to the plurality of first driving transistors, and a voltage of a data signal supplied to the plurality of second pixels during the second reset period may have a level that makes an anode voltage reset to the first power source voltage supplied to the plurality of second pixels by a current flowing to the plurality of second driving transistors.

According to embodiments of the present invention, a display device that can improve (e.g., reduce) motion artifact by reducing a luminance difference of each field in displaying of an image, particularly, a moving image, and a driving method thereof can be provided. With such an effect, a large-scaled display device can display a clear motion picture.

DETAILED DESCRIPTION OF THE EMBODIMENTS

Figure 1:
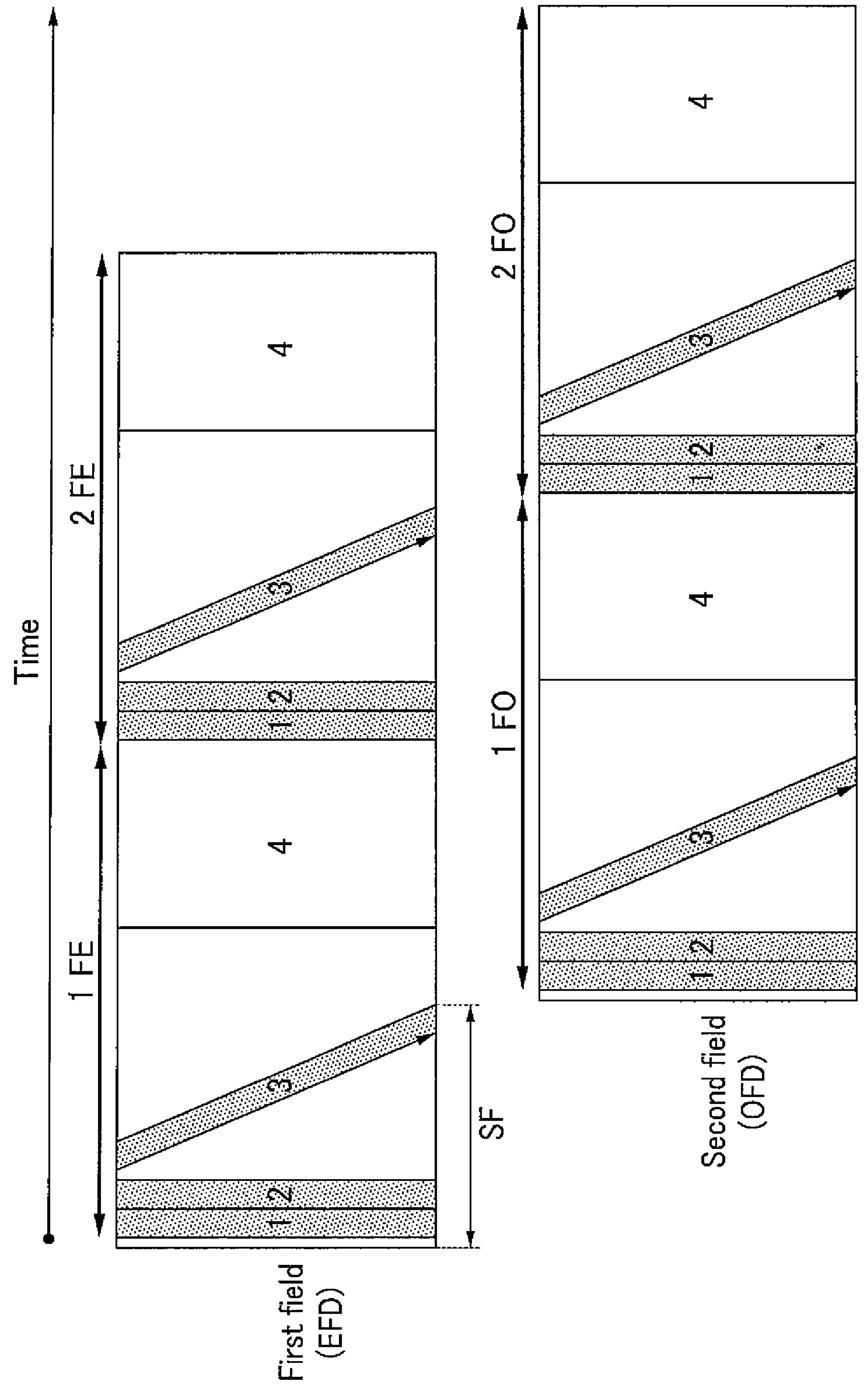
RELATED ART FIG.1
FIG. 1 shows a driving method of a conventional display device.

The present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention.

The drawings and description are to be regarded as illustrative in nature and not restrictive. Like reference numerals designate like elements throughout the specification.

Throughout this specification and the claims that follow, when it is described that an element is "coupled" to another element, the element may be "directly coupled" to the other element or "electrically coupled" to the other element through a third element. In addition, unless explicitly described to the contrary, the word "comprise" and variations such as "comprises" or "comprising", will be understood to imply the inclusion of stated elements but not the exclusion of any other elements.

FIG. 1 shows a driving method of a conventional display device.

In the driving method of FIG. 1, one frame is divided into two fields. A display panel of a display device driven according to the driving method of FIG. 1 is divided into a first pixel group including a plurality of first pixels that emit light in a first field and a second pixel group including a plurality of second pixels that emit light in a second field, from among a plurality of pixels.

Each of the first and second fields is a display period including at least one frame, and one frame sequentially includes a reset period 1, a compensation period 2, a scan period 3, and a light emitting period 4.

In addition, the first field EFD and the second field OFD are driven by being synchronized at a time shifted by a period (e.g., predetermined period) SF. In further detail, one frame 1FO of the second field, temporally adjacent to one frame 1 FE of the first field EFD, is shifted by the period SF from the frame 1 FE. The period SF is set so that scan periods 3 do not overlap each other. One frame 2FE of the first field is subsequent to the frame 1FE and one frame 2FO of the second field is subsequent to the frame 1FO.

A scan period 3 is generated such that data signals respectively corresponding to the plurality of second pixels included in the second pixel group are written during a light emitting period 4 of the first pixel group. Similarly, a scan period 3 is generated such that data signals respectively corresponding to the plurality of first pixels included in the first pixel group are written during a light emitting period 4 of the second pixel group.

When the data signals are sequentially written in the plurality of first and second pixels of the display panel during each scan period 3 of the first field and the second field, the plurality of first pixels and the plurality of second pixels concurrently (e.g., simultaneously) emit light during the respective light emitting periods 4. During one frame, the light emitting periods of the respective fields are alternately generated.

Figure 2A:
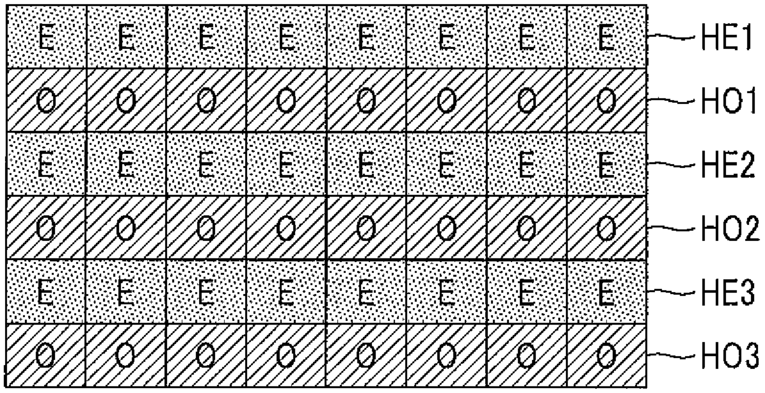
RELATED ART FIG.2A
FIG. 2A to FIG. 2C show light emission patterns of a first pixel group emitting light in a first field and a second pixel group emitting light in a second field when a display panel is divided into two fields.
Figure 2B:
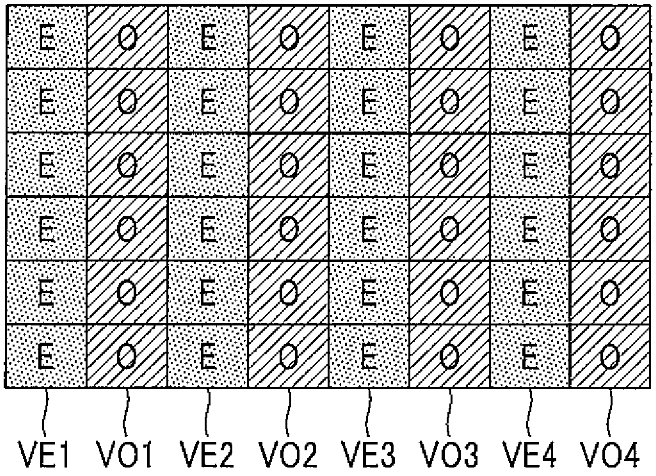
Figure 2C:
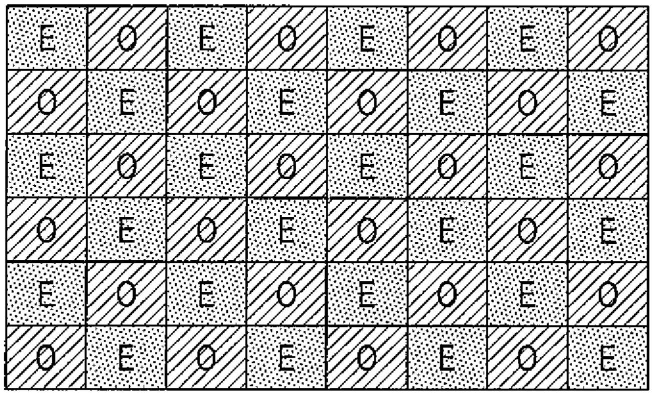
RELATED ART FIG.2C

In driving of each field, light emission patterns of the first pixel group and the second pixel group may have various iterative pattern units, and FIG. 2A to FIG. 2C illustrate representative patterns.

FIG. 2A to FIG. 2C respectively show the first pixel group and the second pixel group emitting light in the first field when the display panel is divided into two.

In FIG. 2A to FIG. 2C, a plurality of unit areas (hereinafter, referred to as first unit areas) forming an area where the first pixel group is disposed are marked as "E", and a plurality of areas (hereinafter, referred to as second unit areas) forming an area where the second pixel group is disposed are marked as "O". Each unit area is formed of at least one pixel.

Because the first unit area E and the second unit area O may have a luminance difference, the first unit area E and the second unit area O may be (or should be) spatially adjacent to each other.

FIG. 2A illustrates a horizontal line array in which first horizontal lines HE1 to HE3 where the plurality of first unit areas E are arranged along a first direction (e.g., a horizontal direction) and second horizontal lines HO1 to HO3 where the plurality of second unit areas O are arranged along the first direction, are alternately arranged along a second direction (e.g., vertical direction). For better understanding and ease of description, FIG. 2A illustrates three of the first horizontal lines and three of the second horizontal lines, but the present invention is not limited thereto. The horizontal line array may be appropriate for representing interlaced broadcasting.

FIG. 2B shows a vertical line array in which first vertical lines VE1 to VE4 where the plurality of first unit areas E are arranged along a second direction (e.g., a vertical direction), and second vertical lines VO1 to VO4 where the plurality of second unit areas O are arranged along the second direction, are alternately arranged in a first direction (e.g., a horizontal direction) that is perpendicular to the second direction. For better understanding and ease of description, FIG. 2B illustrates four of the first vertical lines and four of the second vertical lines, but the present invention is not limited thereto. The vertical line array may be appropriate for representing images having frequent horizontal movement.

FIG. 2C shows a display panel where the plurality of first unit areas E and the plurality of second unit areas O are arranged along a 1×1 dot (DOT) weave. For better understanding and ease of description, the display panel is divided into 6×8 matrix, but the present invention is not limited thereto. The 1×1 dot weave may be appropriate for progressive broadcasting. In addition, the first unit area E and the second unit area O are adjacent to each other in the first and second directions, and therefore the luminance difference between the first unit area E and the second unit area O may be dispersed.

Figure 3:
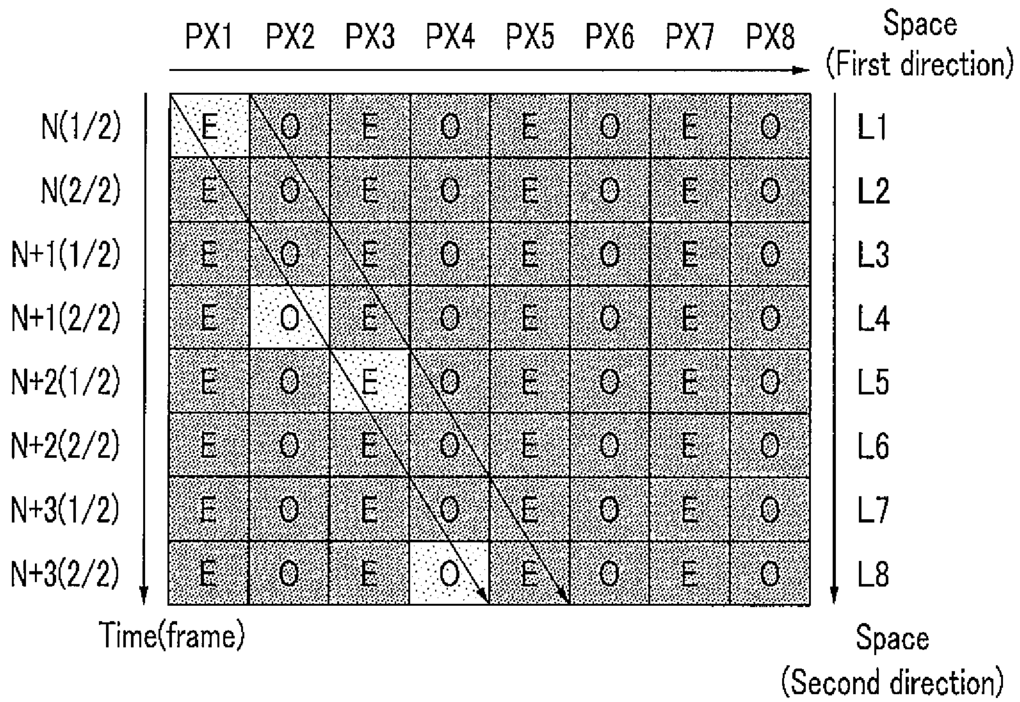
RELATED ART FIG.3
FIG. 3 is a schematic view illustrating a luminance difference between the first pixel group and the second pixel group according to an image speed of 1 pixel per frame (ppf) in image realization using the pattern of FIG. 2B according to the conventional driving method.
Figure 4:
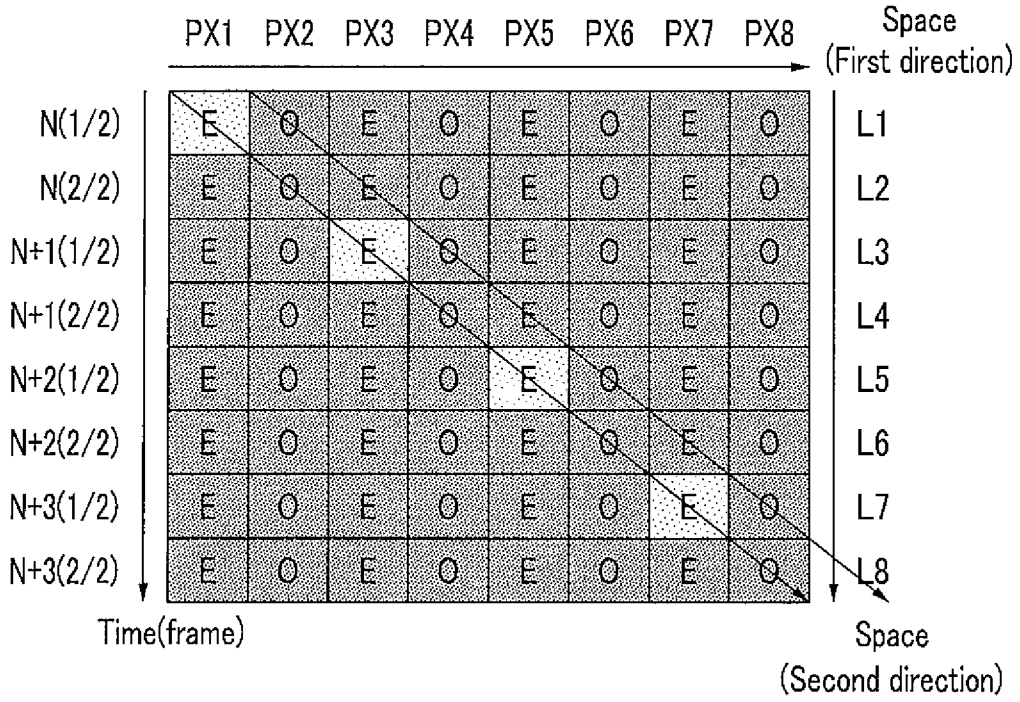
RELATED ART FIG.4
FIG. 4 is a schematic view illustrating a luminance difference between the first pixel group and the second pixel group according to an image speed of 2 ppf in image realization using the pattern of FIG. 2B according to the conventional driving method.

FIG. 3 and FIG. 4 show a luminance difference between the first area and the second area when an image is displayed using the conventional driving method such as the one illustrated in FIG. 1 according to the vertical line array as shown in FIG. 2B from among field-specific light emission pattern methods.

The vertical line array is appropriate for representing an image having frequent horizontal movements, but a luminance difference may occur between the first areas of the first pixel group and the second areas of the second pixel group as the object moves according to the conventional driving method.

Hereinafter, in the schematic diagrams illustrating light emission patterns, a position of an object will be described as an area defined by a matrix of pixel lines and pixel columns for description of a viewing path of human corresponding to movement of an object according to frames and substantial light emission areas. In addition, in the pattern schematic view, the horizontal axis and the vertical axis denote spaces where pixels are located, and a first direction indicates the horizontal axis and a second direction indicates the vertical axis. Further, the other vertical axis indicates time for sequential frames, and four frames, that is, from N frame to (N+3) frame are illustrated by every 1/2 frame unit.

In further detail, FIG. 3 shows moving speed of the object for each pixel unit per frame. This is represented as 1 ppf (pixel per frame). A viewing path of a human that follows the object moving with 1 ppf speed is illustrated with two oblique-lined arrows in FIG. 3.

That is, when a man recognizes an object that emits light in pixels located in an area defined by a first pixel column PX1 of the first pixel line L1 in N frame, a viewing position becomes (1,1).

Thus, in FIG. 3, the viewing path corresponding to the object moving with 1 ppf speed is changed from (1,1) in the N frame to (3,2) in the N+1 frame, (5,3) in the N+2 frame, and (7,4) in the N+3 frame. In FIG. 3 and throughout this specification, the coordinates (y,x) designate the coordinate in the second direction (e.g., y or vertical direction) first and then designate the coordinate in the first direction (e.g., x or horizontal direction). For example, the coordinates (3,2) refer to a pixel at the second pixel column PX2 and the third pixel line L3.

In addition, since the first area and the second area iteratively emit light one time during each frame, the plurality of unit areas alternately emit light in the order of E-O-E-O-E-O-E-O during the N frame to the N+3 frame.

Thus, an area displaying a substantially moving object corresponds to (1,1) in the N frame, (4,2) in the N+1 frame, (5,3) in the N+2 frame, and (8,4) in the N+3 frame. In the schematic view of FIG. 3, light emitting areas in each position are brightly illustrated.

The unit areas emitting light in (1,1), (4,2), (5,3), and (8,4) are the first unit area E, the second unit area O, the first unit area E and the second unit area O, and therefore luminance of the pixels of the first unit areas E and luminance of the second pixels in the second unit areas O are 2:2. Therefore, the first field and the second field do not have a luminance difference in light emission, and accordingly no motion artifact may occur.

However, the circumstance is changed when the moving speed of the object is increased as shown in FIG. 4.

FIG. 4 shows speed of the object that moves two pixel units per frame. The speed in this case is denoted as 2 ppf (pixels per frame). A viewing path of a human following the object that moves the screen with 2 ppf speed is marked by two arrows in the diagonal direction in FIG. 4.

Referring to FIG. 4, the viewing path corresponding to the object moving with 2 ppf speed is changed from (1,1) in the N frame to (3,3) in the (N+1) frame, (5,5) in the (N+2) frame, and (7,7) in the (N+4) frame.

Similar to FIG. 3, in FIG. 4, the first area and the second area iteratively emit light one time during each frame according to the conventional driving method, and therefore the plurality of unit areas alternately emit light in the order of E-O-E-O-E-O-E-O during the N frame to the (N+3) frame.

Therefore, areas that display an object substantially moving according to the light emission pattern correspond to (1,1) in the N frame, (3,3) in the (N+1) frame, (5,5) in the (N+2) frame, and (7,7) in the (N+4) frame. In FIG. 4, light emission areas in each position are brightly displayed. Referring to FIG. 4, a view position of a human according to movement of the object matches the area where the substantial object is displayed.

As shown in FIG. 4, when the moving speed of the object is increased, the unit areas emitting light in each of (1,1), (3,3), (5,5), and (7,7) respectively become a first unit area E-the first unit area E-the first unit area E-the first unit area E. Then, luminance of the first pixel in the first unit area E and luminance of the second pixel in the second unit area O have a ratio of 4:0 so that a luminance difference between the first field and the second field is significantly increased during light emission. That is, the moving object appears in the plurality of first unit areas E of the first field, and therefore images displaying the moving object are separated by each field, thereby deteriorating resolution.

Such a luminance difference may cause motion artifact, and the motion artifact may become more severe as the moving speed of the moving object is increased.

Therefore, a new driving method for light emission patterns may be provided to improve (e.g., to reduce) the occurrence of motion artifact due to moving speed of an object.

Figure 5:
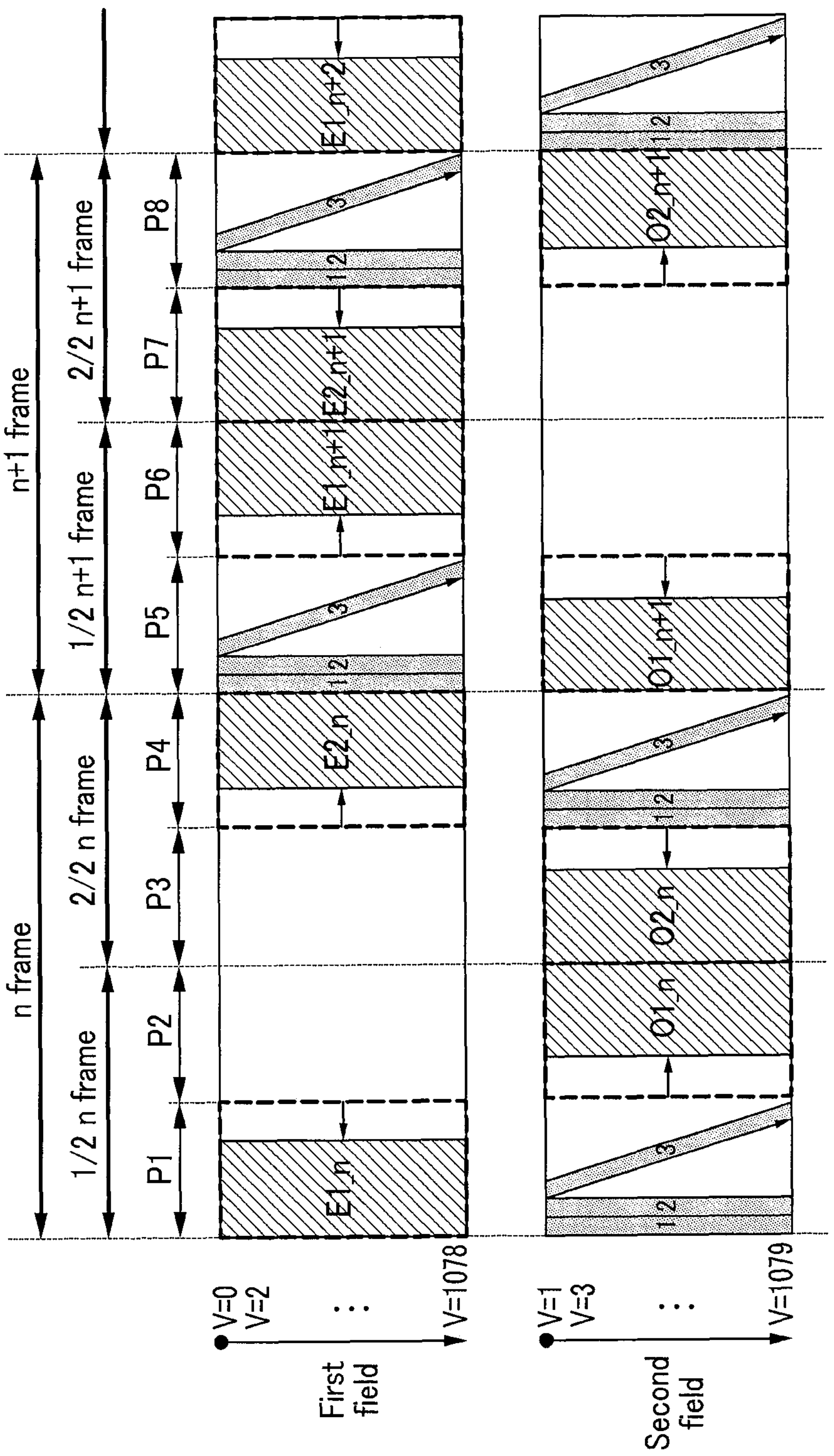
FIG. 5 shows a schematic view illustrating a driving method of a display device according to an exemplary embodiment of the present invention.

FIG. 5 is a schematic view of a display device driving method according to an exemplary embodiment of the present invention.

In the driving method of FIG. 5, one frame is divided into two fields.

Similar to the display panel driven by a conventional driving method, the display panel of the display device driven by the driving method of FIG. 5 is divided into a first pixel group including a plurality of first pixels that emit light in the first field and a second pixel group including a plurality of second pixels that emit light in the second field.

Each of the first field and the second field is a display period including at least one frame, and one frame sequentially includes a reset period 1, a compensation period 2, a scan period 3, and a light emission period 4, which is divided into two light emission periods (e.g., E1_n and E2_n, or O1_n and O2_n).

Referring to FIG. 5, the first field and the second field forming one frame respectively have a light emission period divided into two. In addition, the respective two light emission periods of the first field and the second field do not overlap each other, and have different array type. In addition, in sequential frames, light emission periods of the respective fields have opposite array type. Two light emission periods of the sequential frames do not overlap each other.

Referring to FIG. 5, a light emission period of a first field is divided into two during an n frame, which includes a 1/2 n frame and a 2/2 n frame. The light emission periods of the first field include a first light emission period E1_n started in an early stage P1 of the 1/2 n frame and a second light emission period E2_n started in an end stage P4 of the 2/2 n frame. Here, the early stage P1 refers to the first period among two periods divided from the 1/2 n frame, and the early stage P1 may be a period equal to or shorter than 1/4 of the n frame. In addition, the end stage P4 refers to the second period among two periods divided from the 2/2 n frame, and the end stage P4 may be a period equal to or shorter than 1/4 of the n frame.

A light emission period of a first field is also divided into two during (n+1) frame that is sequential to the n frame and includes a 1/2 n+1 frame and a 2/2 n+1 frame. However, the light emission periods of the first field include a first light emission period E1_n+1 started in an end stage P6 of the 1/2 n+1 frame and a second light emission period E2_n+1 started in an early stage P7 of the 2/2 n+1 frame and sequential to the first light emission period (E1_n+1). Here, the end stage P6 refers to the second period among two periods divided from the 1/2 n+1 frame, and the end stage may be a period equal to or shorter than 1/4 of the n+1 frame. In addition, the early stage P7 refers to the first period among two periods divided from the 2/2 n+1 frame, and may be a period equal to or shorter than 1/4 of the n+1 frame.

In the first field, light emission patterns in sequential frames repeat a separated light emission type (hereinafter, a separation type) as illustrated for the n frame and continued light emission type (hereinafter, a connection type) as illustrated for the (n+1) frame.

In the first field, the reset period 1, the compensation period 2, and the scan period 3 are performed during one frame and then a data signal programmed during a scan period of the corresponding frame is displayed during two light emission periods that are arranged in a separation type or a connection type.

That is, although it is not illustrated in FIG. 5, the reset period 1, the compensation period 2, and the scan period 3 are performed in the n frame before the first light emission period E1_n, and first field data corresponding to the n frame is programmed during the scan period. Then, the first field data of the n frame displays an image during the separation type first and second light emission periods E1_n and E2_n.

In addition, the P5 period in the (n+1) frame includes the reset period 1, the compensation period 2, and the scan period 3, and first field data corresponding to the (n+1) frame is programmed during the scan period. Then, the first field data of the (n+1) frame displays an image during the connection type first and second light emission periods (E1_n+1) and (E2_n+1).

Meanwhile, in FIG. 5, a light emission period of the second field is also divided into two during the n frame, which includes a 1/2 n frame and a 2/2 n frame. The light emission periods of the second field include a first light emission period 1O_n started in an end stage P2 of the 1/2 n frame and a second light emission period O2_n started in an early stage P3 of the 2/2 n frame. Here, the end stage P2 refers to the second period among the two periods divided from the 1/2 n frame, and may be a period equal to or shorter than 1/4 of the n frame. In addition, the early stage P3 refers to the first period among the two periods divided from the 2/2 n frame, and may be a period equal to or shorter than 1/4 of the n frame. In this case, the two light emission periods O1_n and O2_n of the second field are connection type such that they do not overlap the separation type light emission periods E1_n and E2_n of the first field.

During the (n+1) frame that is sequential to the n frame and includes a 1/2 n+1 frame and a 2/2 n+1 frame, a light emission period of the second field is divided into two. However, the light emission periods of the second field include a first light emission period O1_n+1 started in an early stage P5 of the 1/2 n+1 frame and a second light emission period O2_n+1 started in an end stage P8 of the 2/2 n+1 frame. Here, the early stage P5 refers to the first period among the two periods divided from the 1/2 n+1 frame, and may be a period equal to or shorter than 1/4 of the n+1 frame. In addition, the end stage P8 refers to the second period among the two periods divided from the 2/2 n+1 frame, and may be a period equal to or shorter than 1/4 of the n+1 frame.

In this case, the two light emission periods O1_n+1 and O2_n+1 of the second field are separation type such that they do not overlap the connection type light emission periods E1_n+1 and E2_n+1 of the first field.

In addition, as arrays of the light emission periods in the sequential frames, the connection type and the separation type are alternately repeated.

The second field performs application of the corresponding scan signal for reset, threshold voltage compensation, and pixel activation with respect to a plurality of second pixels in the reset period 1, the compensation period 2, and the scan period 3 of the P1 period in the n frame. In addition, the second field data corresponding to the n frame is programmed during the scan period. Then, the second field data of the n frame displays an image during the connection type first and second light emission periods O1_n and O2_n.

In addition, the reset period 1, the compensation period 2, and the scan period 3 of the (n+1) frame are provided in the P4 period of the previous frame, that is, the n frame.

Since the light emission periods of the first and second fields should not be overlapped with each other, the reset, compensation, and scan of the second field in the (n+1) frame are performed during the first field light emission period P4 of the previous frame, that is, the n frame.

When the second field data corresponding to the (n+1) frame is programmed during the scan period, an image corresponding to the separation type first and second light emission periods (O1_n+1) and (O2_n+1) is displayed.

In one frame, the type of the light emission period of the first field and the type of the light emission period of the second field are not equivalent to each other and they do not temporally overlap each other. In addition, in each field, the types of the light emission periods of sequential frames are not equivalent to each other. Therefore, according to the driving method of the exemplary embodiment of FIG. 5, a plurality of unit areas in the sequential two frames alternately emit light in the order of E-O-O-E or O-E-E-O.

Figure 6A:
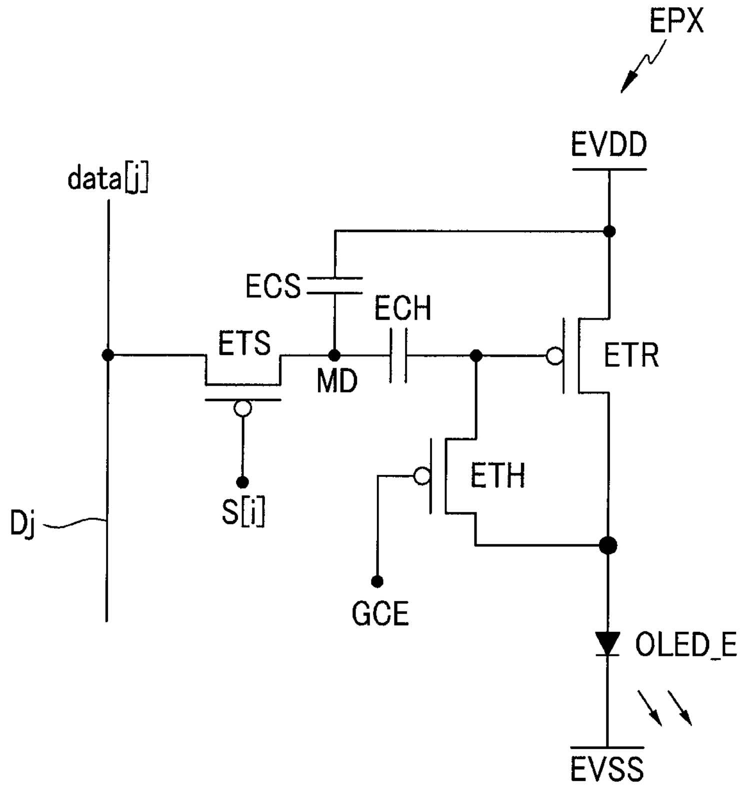
FIG. 6A and FIG. 6B show first and second pixel structures respectively corresponding to first unit areas E and second unit areas O among the first pixel group and the second pixel group.
Figure 6B:
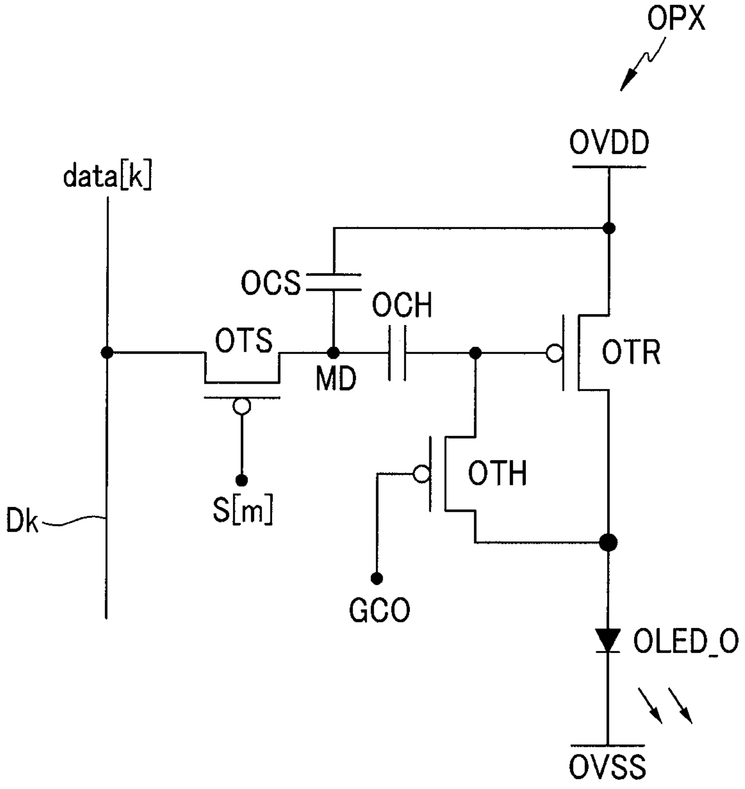

FIG. 6A and FIG. 6B show structures of first pixels and second pixels respectively corresponding to the first unit areas E and the second unit areas O in the first pixel group and the second pixel group.

As shown in FIG. 6A, in the first field, a first pixel EPX included in the first unit area E for emitting light in the first field includes a switching transistor ETS, a driving transistor ETR, a compensation transistor ETH, a compensation capacitor ECH, and a storage capacitor ECS.

The driving transistor ETR includes a drain electrode coupled with an anode of an organic light emitting diode OLED_E, a gate electrode coupled to a first electrode of the compensation capacitor ECH, and a source electrode coupled to a first power source voltage EVDD. The driving transistor ETR controls a driving current supplied to the organic light emitting diode OLED_E.

The compensation transistor ETH includes a gate electrode to which a first compensation control signal GCE is input, and two electrodes respectively coupled to the drain electrode and the gate electrode of the driving transistor ETR.

A second electrode of the compensation capacitor ECH is coupled to a first electrode of the storage capacitor ECS and a first electrode of the switching transistor ETS at a node MD. A second electrode of the storage capacitor ECS is coupled to the first power source voltage EVDD.

A gate electrode of the switching transistor ETS is applied with a scan signal S[i], and a second electrode of the switching transistor ETS is coupled to a data line Dj. A data signal data[j] is transmitted through the data line Dj.

A cathode of the organic light emitting diode OLED_E is coupled to a second power source voltage EVSS.

The first power source voltage EVDD and the second power source voltage EVSS supply driving voltages for pixel operation. In further detail, the first power source voltage EVDD and the second power source voltage EVSS supply driving voltages for operation of the driving transistor ETR and the organic light emitting diode OLED_E for the reset period 1, the compensation period 2, the scan period 3, and the light emitting period 4, respectively.

The first power source voltage EVDD has at least two levels according to the reset period 1, the compensation period 2, the scan period 3, and the light emitting period 4. The first compensation control signal GCE becomes a level that turns on the compensation transistor ETH only during the compensation period 2.

The scan signal S[i] has at least two levels according to the reset period 1, the compensation period 2, the scan period 3, and the light emitting period 4. In further detail, the scan signal S[i] becomes a level that turns on the switching transistor ETS only for a period during which the data signal is written to the first pixels in the corresponding scan line during at least the compensation period 2 and the scan period 3.

The second power source voltage EVSS may be maintained with a constant level, or a voltage level of the second power source voltage EVSS during the reset period 1 may be different from voltage levels of the second power source voltage EVSS during other three periods.

As shown in FIG. 6B, a second pixel OPX included in the second unit area O for emitting light in the second field includes a switching transistor OTS, a driving transistor OTR, a compensation transistor OTH, a compensation capacitor OCH, and a storage capacitor OCS.

The driving transistor OTR includes a drain electrode coupled with an anode of an organic light emitting diode OLED_O, a gate electrode coupled with a first electrode of the compensation capacitor OCH, and a source electrode coupled to a third power source voltage OVDD.

The compensation transistor OTH includes a gate electrode to which a second compensation control signal GCO is input and two electrodes respectively coupled to the drain electrode and the gate electrode of the driving transistor OTR.

A second electrode of the compensation capacitor OCH is coupled to a first electrode of the storage capacitor OCS and a first electrode of switching transistor OTS at a node MD. A second electrode of the storage capacitor OCS is coupled to the third power source voltage OVDD.

A scan signal S[m] is input to a gate electrode of the switching transistor OTS and a second electrode of the switching transistor OTS is coupled with a data line Dk. A data signal data[k] is transmitted through the data line Dk.

A cathode of the organic light emitting diode OLED_O is coupled with a fourth power source voltage OVSS.

The third power source voltage OVDD has at least two levels according to the reset period 1, the compensation period 2, the scan period 3, and the light emitting period 4. The second compensation control signal GCO becomes a level that turns on the compensation transistor OTH only for the compensation period 2.

The scan signal S[m] has at least two levels according to the reset period 1, the compensation period 2, the scan period 3, and the light emitting period 4. In further detail, the scan signal S[m] becomes a level that turns on the switching transistor OTS for a period during which a data signal is written to the second pixels in the corresponding scan line among at least the compensation period 2 and the scan period 3.

The fourth power source voltage OVSS may be maintained with a constant level, or a voltage level of the fourth power source voltage OVSS during the reset period 1 may be different from voltage levels of the fourth power source voltage OVSS during other three periods.

As described, the first pixel EPX and the second pixel OPX have substantially the same structure and operation in the pixel structure according to one exemplary embodiment of the present invention. Wirings supplying the first power source voltage EVDD and the third power source voltage OVDD, wiring supplying the first compensation control signal GCE and the second compensation control signal GCO, and wirings supplying the second power source voltage EVSS and the fourth power source voltage OVSS are determined according to the first area and the second area.

The first pixel is a pixel of the first unit area E and thus the first pixel is driven during the first field, and the second pixel is a pixel in the second unit area O and thus the second pixel is driven during the second field.

Figure 7:
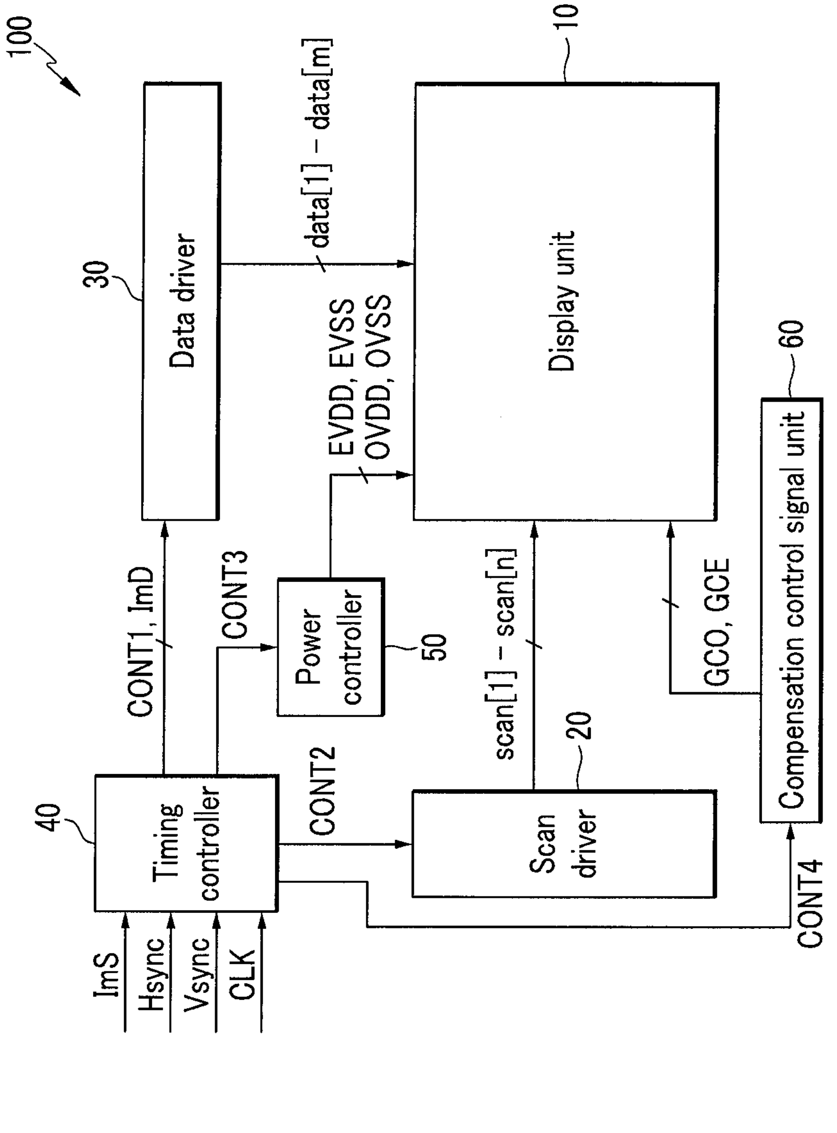
FIG. 7 is a block diagram of a display device according to an exemplary embodiment of the present invention.

FIG. 7 is a block diagram of a display device according to one exemplary embodiment of the present invention.

The display device 100 includes a timing controller 40, a data driver 30, a scan driver 20, a power controller 50, a compensation control signal unit 60, and a display unit 10. The display panel may further include at least the timing controller 40, the data driver 30, the scan driver 20, the power controller 50, and the compensation control signal unit 60 in addition to the display unit 10.

The display unit 10 has a display area including the first pixel group and the second pixel group, and a plurality of data lines for transmitting a plurality of data signals data[1] to data[n], a plurality of scan lines for transmitting a plurality of scan signals scan[1] to scan[n], a plurality of power source lines, and a plurality of control signal lines are located (e.g., are formed) therein.

The scan driver 20 generates the plurality of scan signals scan[1]-scan[n] according to a second driving control signal CONT2, and transmits the scan signals to the corresponding scan lines during the scan period 3.

The data driver 30 samples and holds an image data signal ImD input according to a first driving control signal CONT1, and transmits the plurality of data signals data[1]-data[m] to the plurality of data lines, respectively. The image data signal ImD may be a first field image data signal or a second field image data signal among image signals (or image data signals).

The power controller 50 determines levels of the first to fourth power source voltages EVDD, EVSS, OVDD, and OVSS according to the reset period 1, the compensation period 2, the scan period 3, and the light emitting period 4 of each of the first and second pixel groups, and supplies the voltage to the power source lines according to a third driving control signal CONT3.

The compensation control signal unit 60 determines levels of first and second compensation control signals GCE and CGO during the respective compensation periods 2 of the first and second pixel groups according to a fourth driving control signal CONT4, and supplies respective voltages to the control signal lines.

The timing controller 40 generates the first to fourth driving control signals CON1 to CON4 and the image data signal ImD according to an image signal ImS, a vertical synchronization signal Vsync, a horizontal synchronization signal Hsync, and a main clock signal CLK.

The timing controller 40 generates the image data signal ImD by dividing the image signal ImS into frame units according to the vertical synchronization signal Vsync and dividing the image signal ImS into scan line units according to the horizontal synchronization signal Hsync, and transmits the image data signal ImD and the first driving control signal CON1 to the data driver 30.

Synchronization signals of the image signal ImS, the vertical synchronization signal Vsync, the horizontal synchronization signal Hsync, and the main clock signal CLK are processed from an external input signal.

The image signal ImS is a signal generated by dividing the external input signal into frame units for each field and processed in accordance with the corresponding field. That is, images respectively displayed in the first and second fields of the external input signal are divided into frame units, and first and second field image data signals of sequential frame units are arranged according to vertical and horizontal synchronization such that the image data signal ImS is generated.

The image signal ImS is divided into the first field image data signal transmitted to the first pixel group and the second field image data signal transmitted to the second field image data signal.

According to one exemplary embodiment of the present invention, the display unit may be wholly scanned during unit time (i.e., 1/240 sec.), and therefore, the vertical synchronization signal Vsync may be 240 Hz. The horizontal synchronization signal Hsync is a frequency determined according to the scan period 3 during one frame, and is set to a frequency for transmitting data signals to entire pixels of one of the first pixel group or the second pixel group during the scan period 3.

In further detail, as shown in FIG. 2A, when the first group pixels and the second group pixels are not mixed in each row, only the half of the entire scan lines need to be scanned during the scan period 3. Therefore, a scan period allowed for each scan line is determined by dividing the scan period 3 with the half of the entire scan line numbers, and the frequency of the horizontal synchronization signal Hsync also can be determined.

However, as shown in FIG. 2B and FIG. 2C, when the first group pixels and the second group pixels are mixed in each row, the entire scan lines should be scanned during the scan period 3. Accordingly, a scan period allowed for each scan line is determined by dividing the scan period 3 with the entire scan line numbers, and the frequency of the horizontal synchronization signal Hsync also can be determined.

The main clock signal CLK may be one of a clock signal having a basic frequency included in the external input signal and a clock signal generated through appropriate preprocessing.

Figure 8:
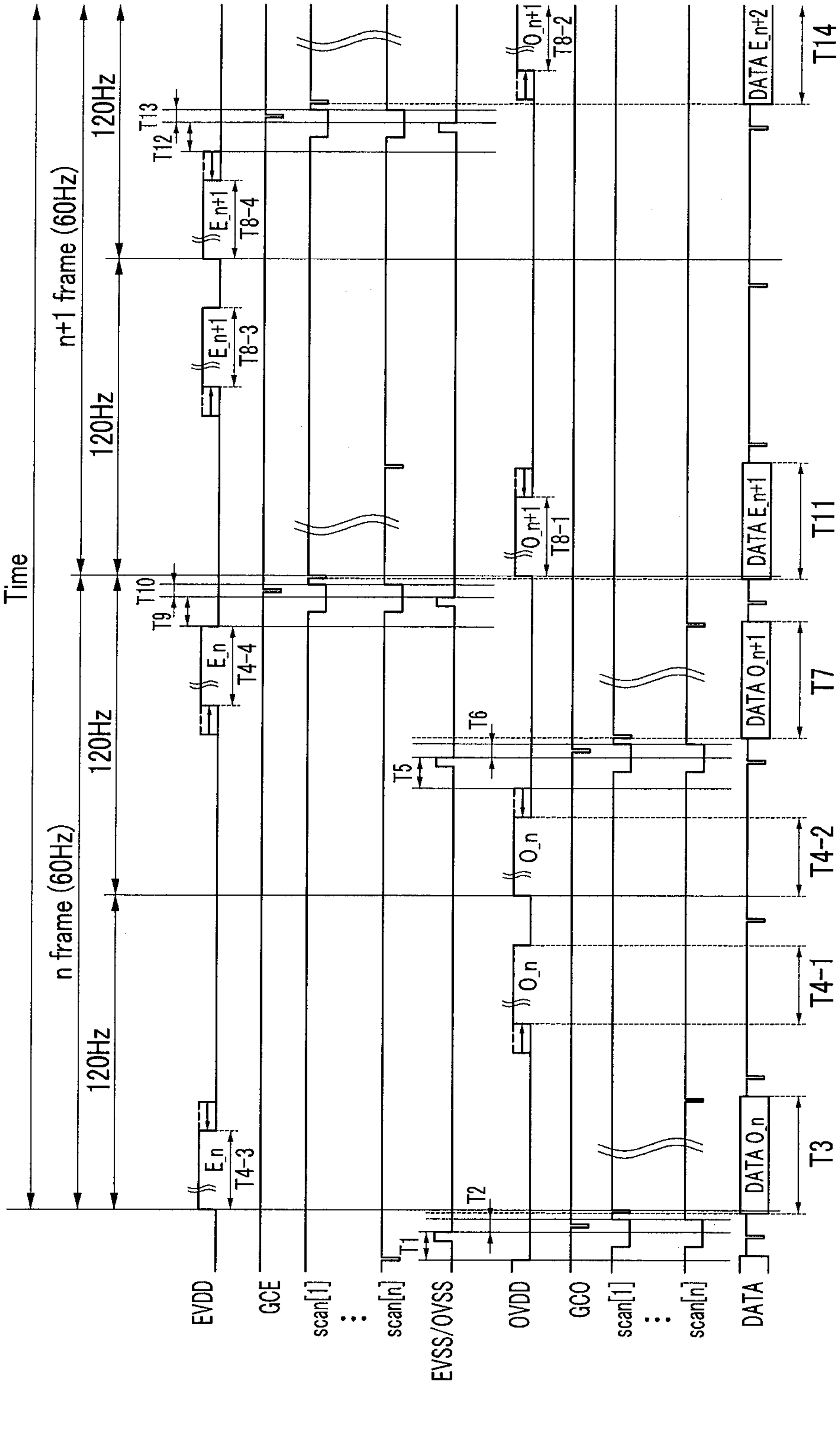
FIG. 8 shows a power source voltage, a scan signal, a compensation control signal, and a data signal according to the driving method of the display device according to an exemplary embodiment of the present invention.

FIG. 8 shows the power source voltage, the scan signals, the compensation control signals, and the data signals according to one exemplary embodiment of the present invention.

In further detail, FIG. 8 shows waveforms of control signals transmitted to the wirings and a voltage level of the power source voltage for operation of each pixel according to the driving method of the exemplary embodiment shown in FIG. 5.

Referring to FIG. 8, n frame and (n+1) frame are illustrated based on the light emission period.

In FIG. 8, the second power source voltage EVSS and the fourth power source voltage OVSS are illustrated with one line for convenience.

First, during a period T1 (or during a portion of the period T1), high-level fourth power source voltages OVSS of the plurality of second pixels corresponding to the plurality of second unit areas O of the second field are transmitted. The high level may be 12V, but it is not limited thereto. For the period (or a portion of the period) during which the fourth power source voltage OVSS is transmitted at high level, the data voltage DATA applied to the entire data lines coupled to the entire pixels of the display panel may be at low level. Here, the low level may be 0V, but it is not limited thereto.

When the data voltage DATA is decreased to the low level, the gate voltage of the driving transistor OTR of the second pixel is sufficiently decreased such that much more current can be flowed through the driving transistor OTR of the second pixel.

During the reset period T1, a voltage (i.e., a voltage higher by about 0 to 3V than the typical OVSS) stored in the intrinsic capacitor of the organic light emitting diode OLED_O is discharged to equalize the anode voltage of the organic light emitting diode OLED_O and the third power source voltage OVDD. Since the data voltage DATA is decreased to the minimum level such as 0V and thus the current driving capability of the driving transistor OTR is improved or optimized, the anode voltage of the organic light emitting diode OLED_O can be decreased within a relatively short time (e.g., the shortest time).

During the reset period T1, the level of the plurality of scan signals scan[1] to scan[n] should be at low level for a period during which the fourth power source voltage OVSS is transmitted at high level.

At a termination time point of the reset period T1, the third power source voltage OVSS is decreased to the low level, i.e., 0V. When the reset period T1 is terminated while the plurality of scan signals scan[1] to scan[n] are at low level, the plurality of scan signals scan[1] to scan[n] do not experience level change. FIG. 6B shows that the corresponding scan signal S[m] among the plurality of scan signals scan[1] to scan[n], is applied to the gate electrode of the switching transistor OTS.

After a gap (e.g., a predetermined gap) from the start time point of the compensation period T2, the second compensation control signal GCO is decreased to the low level and maintained with the low level. The plurality of data voltages DATA maintain high level during the compensation period T2. Here, the high level may be 6V. In this case, the third power source voltage OVDD is maintained with a low level of 3V.

The compensation transistor OTH is turned on according to the first compensation control signal GCO and thus the driving transistor OTR is diode-coupled, and a voltage obtained by subtracting a threshold voltage of the driving transistor OTR from the third power source voltage OVDD is supplied to the gate electrode of the driving transistor OTR. In this case, the compensation capacitor OCH is charged with a voltage that corresponds to a voltage difference between the voltage of the data signal data[k] corresponding to each pixel and the voltage (OVDD-VTH).

The second compensation control signal GCO maintained with the low level for a gap (e.g., a predetermined gap) during the compensation period T2 and prior to the scan period T3, is increased to high level before the plurality of scan signals scan[1] to scan[n] are increased to high level.

During the scan period T3, the plurality of scan signals scan[1] to scan[n] are sequentially decreased to low level such that the switching transistor OTS is turned on. During the turn-on period of the switching transistor OTS, the corresponding data signal data[k] is transmitted to the node MD at which the second electrode of the compensation capacitor OCH and the first electrode of the storage capacitor OCS are coupled to each other. During the scan period T3, a data voltage DATAO_n according to the second field data signal of the n frame is written in each of the plurality of second pixels 3.

The first electrode of the compensation capacitor OCH is coupled to the gate electrode of the driving transistor OTR and is in a floating state. A change amount of the voltage of the MD is distributed according to a capacity ratio between the storage capacitor OCS and the compensation capacitor OCH, and a voltage change amount Δ V distributed to the compensation capacitor OCH is reflected to the gate voltage of the driving transistor OTR. Thus, the gate voltage of the driving transistor OTR during the scan period T3 becomes (OVDD (3V)−VTH+Δ V).

During the scan period T3 of the second pixel, the plurality of first pixels for emitting light in the first field concurrently (e.g., simultaneously) emit light during a period T4-3 with a data voltage DATAE_n (not shown) according to the first field data signal of the n frame.

The first light emission period T4-3 of the first pixel is the first light emission period of a separation-type first field light emission pattern. The first light emission period T4-3 may be equal to or shorter than the scan period T3 of the second pixel.

When the scan period T3 of the second field is terminated, the plurality of data signals DATA are maintained with high level voltages, for example, 5V, in the exemplary embodiment of the present invention. A gap (e.g., a predetermined gap) may exist between the scan period T3 and a light emission period T4-1. The light emission period T4-1 is the first light emission period among light emission periods O_n with respect to the data voltages DATAO_n according to the second field data signal after the scan period (i.e., data writing period).

The data voltages DATAO_n according to the second field data signal written during the scan period T3 emit light during two light emission periods. That is, a light emission pattern of the n frame is a connection type, and thus the first light emission period T4-1 and the second light emission period T4-2 are connected (e.g., are substantially adjacent each other). A time gap (e.g., a predetermined time gap) may exist between the two light emission periods T4-1 and T4-2.

The two light emission periods T4-1 and T4-2 do not overlap a light emission period E_n with respect to the first field data voltage DATAE_n that emits light with separation type in the n frame. That is, the light emission period E_n with respect to the first field data voltage DATAE_n is the second separation type light emission period, and thus the first light emission period T4-3 and the second light emission period T4-4 are separated. The first light emission period T4-3 exists prior to the light emission periods T4-1 and T4-2 of the second field and the second light emission period T4-4 exists prior to the light emission periods T4-1 and T4-2 of the second field so that the light emission periods of the respective fields do not overlap each other.

During the second light emission periods T4-1 and T4-2 of the second field, the third power source voltage OVDD is increased to high level, for example, 12V, in the exemplary embodiment of the present invention. The plurality of scan signals scan[1] to scan[n] still maintains high level.

When the third power source voltage OVDD is increased at the start time point of the first light emission period T4-1 of the n frame of the second field, the voltage of the node MD and the gate voltage of the driving transistor OTR are increased by substantially the same amount according to coupling between the capacitor OTS and the capacitor OCH.

For example, because the voltage of the node MD is increased by 10V as the third power source voltage OVDD is increased to 12V from 2V, a drain-source voltage of the switching transistor OTS is increased by substantially the same amount. A leakage current of a typical transistor is proportional to a drain-source voltage, and therefore a leakage current flowing to through the data line from the node MD is increased.

Thus, the drain-source voltage of the switching transistor OTS is decreased when a voltage of the data line Dk, increasing due to the coupling, is increased to at least the middle level of the voltage of the node MD to thereby reduce the leakage current.

For example, when a voltage range of the data signal DATA is 1V to 6V during the scan period T3, the voltage of the node MD right after the scan period is expected to be included within the range. When the third power source voltage OVDD is further increased by 10V during the light emission periods T4-1 and T4-2, the voltage range of the node MD becomes 11V to 16 V, and in the worst case, the voltage of the data line Dk becomes 1V and the voltage of the node MD becomes 16V such that the drain-source voltage of the switching transistor OTS becomes 15V. However, when the voltage of the data line Dk is increased only to 13.5V during the light emission periods T4-1 and T4-2, the drain-source voltage becomes 2.5V in the worst case. Accordingly, the leakage current can be reduced to approximately 1/6 (2.5/15).

Since the third power source voltage OVDD is increased, a driving current determined by a difference between the source voltage and the gate voltage is generated in the driving transistor OTR. Since the gate voltage OVDD (3V)−VTH+Δ V is subtracted from the source voltage OVDD (i.e., 12V) of the driving transistor OTR and then the threshold voltage VTH is subtracted again, the driving current of the driving transistor OTR becomes a current corresponding to a square of a voltage (9V−Δ V). That is, variation due to the same data signals between driving currents does not occur due to a threshold voltage variation between the driving transistors.

When the two light emission periods T4-1 and T4-2 are respectively terminated, the third power source voltage OVDD becomes low level (e.g., 3V). In addition, a reset period T5, a compensation period T6, and a scan period T7 are repeated in a second field of the current frame, that is, the n frame, before the (n+1) frame is started. In this case, the second light emission period T4-4 is performed according to a first field data voltage of the n frame of the first field for a period that is equal to or shorter than the scan period T7.

During the scan period T7, a data voltage DATAO_n+1 according to a second field data signal with respect to the (n+1) frame is written. A light emission period O_n+1 with respect to the data voltage DATAO_n+1 becomes the separation type in the (n+1) frame of the second field. Thus, the first light emission period T8-1 and the second light emission period T8-2 of the (n+1) frame are separated such that an image according to the data voltage DATAO_n+1 is displayed.

After the second light emission period T4-4 according to the first field data voltage DATAE_n of the n frame is terminated, a reset period T9, a compensation period T10, and a scan period T11 are performed in a first field of the next frame, that is, the (n+1) frame.

During the scan period T11, a data voltage DATAE_n+1 according to the first field data signal with respect to the (n+1) frame is written. Unlike the n frame, a light emission period E_n+1 with respect to the data voltage DATAE_n+1 becomes a connection type. Thus, the first light emission period T8-3 of the (n+1) frame and the second light emission period T8-4 are continued such that an image according to a data voltage DATAE_n+1 is displayed. According to an embodiment, a time gap may exist between the first light emission period T8-3 and the second light emission period T8-4. In addition, the light emission periods of the respective fields do not overlap each other in the (n+1) frame.

Afterwards in the following frames, that is, the (n+2) frame and subsequent frames, light emission patterns in the respective fields are alternately performed as shown in FIG. 8.

FIG. 8 illustrates an example driving of the second pixel OPX in the second unit area, but the first pixel EPX of the first unit area is driven in the first field in substantially the same way as that of the second pixel OPX.

In addition, the high or low voltage level is an example in the present exemplary embodiment, and the present invention is not limited thereto.

Figure 9:
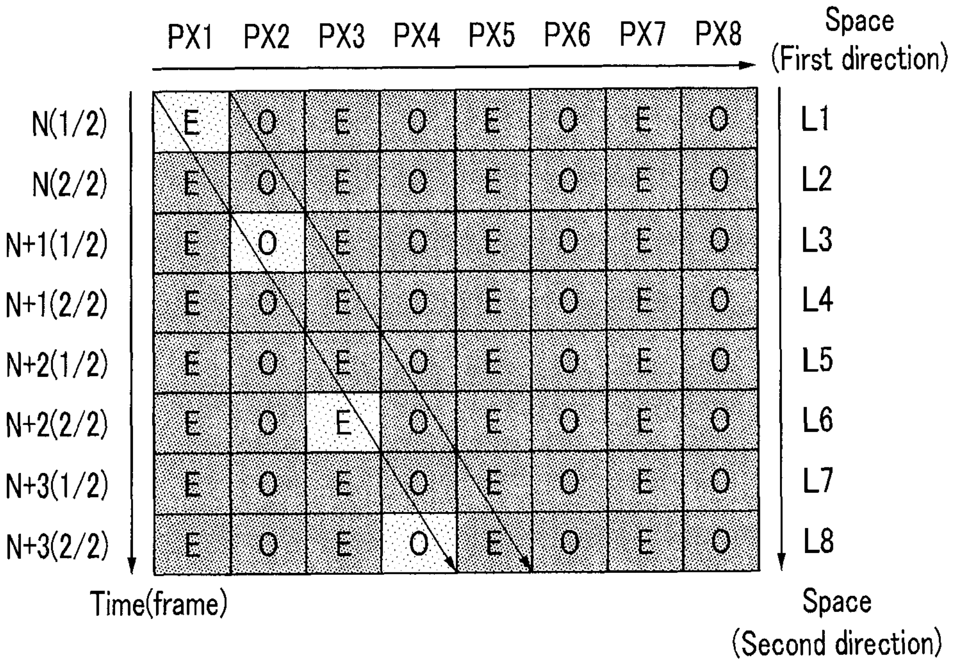
FIG. 9 is a schematic view illustrating a luminance difference between the first pixel group and the second pixel group according to an image speed of 1 ppf in realization of an image using the pattern of FIG. 2B according to the driving method of an exemplary embodiment of the present invention.
Figure 10:
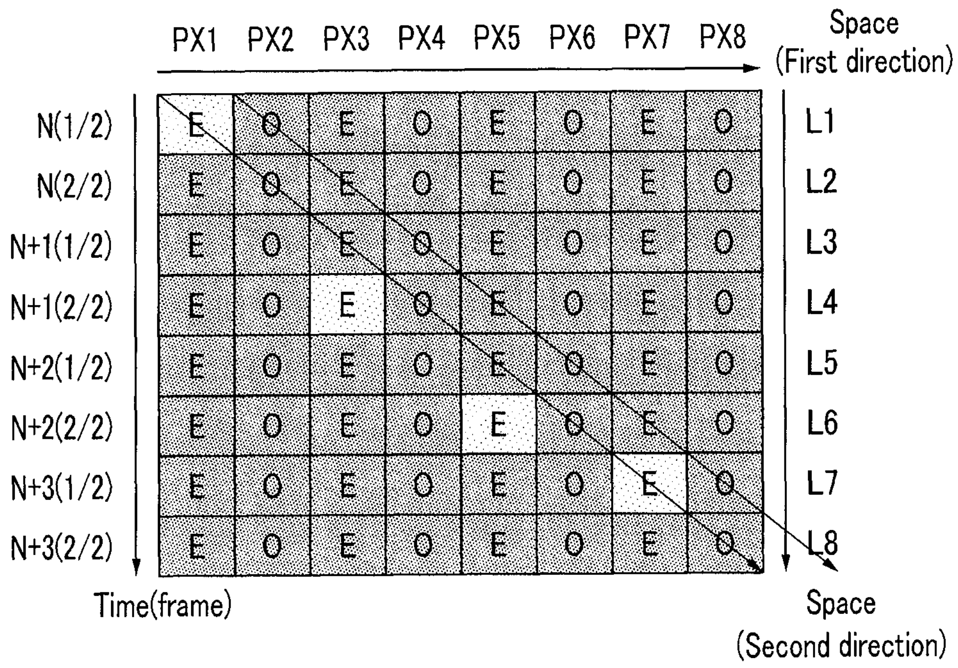
FIG. 10 is a schematic view illustrating a luminance difference between the first pixel group and the second pixel group according to an image speed of 2 ppf in realization of an image using the pattern of FIG. 2B according to the driving method of an exemplary embodiment of the present invention.

FIG. 9 and FIG. 10 show a luminance difference between the first pixel group and the second pixel group in the vertical line matrix light emission pattern of FIG. 2B when an image is displayed by the driving method of FIG. 8.

In description of FIG. 9 and FIG. 10, a viewing path of a human according to movement of an object and a location of a substantial light emission area are equivalent to those shown in FIG. 3 and FIG. 4.

In FIG. 9, a moving speed of the object is 1 ppf, that is, the speed that the object moves corresponds to one pixel unit per frame, and in FIG. 10, a moving speed of the object is 2 ppf, that is, the speed that the object moves corresponds to two pixel units per frame.

In FIG. 9, a viewing path of a human that follows the movement of the object moving in the screen with the speed of 1 ppf corresponds to two arrows from the N frame to the (N+3) frame. In further detail, the viewing path corresponds to (1,1) in the N frame, (3,2) in the (N+1) frame, (5,3) in the (N+2) frame, and (7,4) in the (N+3) frame.

From the N frame to the (N+3) frame, areas emitting light by the driving method of FIG. 8 are EOOE/OEEO/EOOE/OEEO.

That is, a first area and a second area respectively emit light two times during each frame, and each field alternately has separation type and the connection type matrix patterns during the corresponding light emission period such that the matrix patterns do not overlap each other. In addition, the respective fields of each frame alternatively have the separation type light emission period and the connection type light emission period.

Thus, areas that display the object that substantially moves, correspond to (1,1) in the N frame, (3,2) in the (N+1) frame, (6,3) in the (N+2) frame, and (8,4) in the (N+3) frame due to the order of the areas emitting light by the driving method of FIG. 8. The areas are portions brightly marked in FIG. 9.

In case of FIG. 9, light emission occurred in a unit pixel area that is not included in the viewing path in the (N+2) frame and the (N+3) frame, due to the substantial time difference between time that the object moves according to the light emission area order, and due to the substantial moving speed of the object. However, unit areas emitting light in (1,1), (3,2), (6,3), and (8,4) are E-O-E-O, and therefore luminance of the first pixel in the first unit area E and luminance of the second pixel of the second unit area O are 2:2.

Accordingly, the motion artifact due to a luminance difference does not occur. Furthermore, pixels of a unit area emitting light for each frame unit have spaces and are dispersed for each field so that a moving object can be further clearly displayed.

The effect of improving resolution of a motion picture according to the driving method of the present exemplary embodiment is significant in displaying of an object moving with high speed.

In FIG. 10, a viewing path of a human following the object moving the screen with 2 ppf speed is shown as two arrows from the N frame to the (N+3) frame. In further detail, areas that display the moving object correspond to (1,1) in the N frame, (3,3) in the (N+1) frame, (5,5) in the (N+2) frame, and (7,7) in the (N+3) frame.

The areas emit light by the driving method according to the present exemplary embodiment from the N frame to the (N+3) frame in the order of EOOE/OEEO/EOOE/OEEO.

Thus, areas that substantially display the moving object correspond to (1,1) in the N frame, (4,3) in the (N+1) frame, (6,5) in the (N+2) frame, and (7,7) in the (N+3) frame. In FIG. 10, the corresponding unit areas are brightly marked.

In case of FIG. 10, light emission areas deviate from the viewing path due to a time difference between a time for sequential light emission areas and a time for substantial movement of the object with speed of 2 ppf. That is, due to the time difference, light emission occurs in the unit pixel areas of (4,3) and (6,5) that deviate from the viewing path in the (N+1) frame and the (N+2) frame.

A luminance ratio between the first pixel in the first unit area E and the second pixel in the second unit area O becomes 2:0.

Thus, when the moving speed of the object is the same, the luminance ratio is reduced to the half compared to the light emission according to the conventional driving method of FIG. 4.

That is, according to the driving method of the present invention, the object is displayed two times, that is, the half compared to FIG. 4, during four frames in the first unit areas E included in the viewing path of a human.

Thus, a luminance difference between the first field and the second field is decreased and accordingly resolution deterioration or motion artifact due to a luminance difference can be effectively improved.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims. Therefore, those skilled in the art can understand that various modifications and other equivalent exemplary embodiments may be made therefrom. Further, a person of ordinary skill in the art may omit a part of the constituent elements described in the present specification without deterioration of the performance thereof or add a constituent element in order to improve the performance. In addition, a person of ordinary skill in the art may change an order of the steps of the method described in the present specification according to a processing environment or equipment. Accordingly, the scope of the present invention will be defined by the accompanying claims and equivalents thereof, not the aforementioned exemplary embodiment.

| <Description of some of the reference symbols> | |
|---|---|
| 1: reset period | 2: compensation period |
| 3: scan period | 4: light emission period |
| 10: display unit | 20: scan driver |
| 30: data driver | 40: timing controller |
| 50: power controller | 60: compensation control signal unit |

What is claimed is:

1. A display device configured to divide one frame into at least two fields and comprising a plurality of first pixels configured to emit light in a first field of the at least two fields and a plurality of second pixels configured to emit light in a second field of the at least two fields, wherein the first field comprises a first compensation period during which threshold voltages of driving transistors of the plurality of first pixels are concurrently compensated, a first scan period during which scan signals corresponding to the plurality of first pixels are sequentially transmitted and corresponding data signals are programmed, and at least two first light emission periods during which the plurality of first pixels concurrently emit light according to the programmed data signals, wherein the second field comprises a second compensation period during which threshold voltages of driving transistors of the plurality of second pixels are concurrently compensated, a second scan period during which scan signals corresponding to the plurality of second pixels are sequentially transmitted and corresponding data signals are programmed, and at least two second light emission periods during which the plurality of second pixels concurrently emit light according to the programmed data signals, wherein the at least two first light emission periods of a separation type comprise a light emission period at a beginning of a frame and a light emission period at an end of the frame separated from the light emission period at the beginning of the frame by a non-emission period of the plurality of first pixels, and wherein the at least two second light emission periods of a connection type comprise a light emission period at the non-emission period of the plurality of first pixels.

2. The display device of claim 1, wherein the at least two first light emission periods are connection type light emission periods such that they are sequential, or separation type light emission periods such that they are separated by a predetermined time, and the connection type light emission periods and the separation type light emission periods are repeated during sequential frames.

3. The display device of claim 2, wherein the predetermined time comprises the at least two second light emission periods that are connection type light emission periods.

4. The display device of claim 1, wherein the at least two second light emission periods are connection type light emission periods such that they are sequential, or separation type light emission periods such that they are separated by a predetermined time, and the connection type light emission periods and the separation type light emission periods are repeated during sequential frames.

5. The display device of claim 4, wherein the predetermined time comprises the at least first light emission periods that are connection type light emission periods.

6. The display device of claim 1, wherein, in sequential frames, the at least two first light emission periods and the at least two second light emission periods are alternately arranged such that two connection type light emission periods and separation type light emission periods are separated by a period that equals at least two light emission periods.

7. A display device configured to divide one frame into at least two fields and comprising a plurality of first pixels configured to emit light in a first field of the at least two fields and a plurality of second pixels configured to emit light in a second field of the at least two fields, wherein the first field comprises a first compensation period during which threshold voltages of driving transistors of the plurality of first pixels are concurrently compensated, a first scan period during which scan signals corresponding to the plurality of first pixels are sequentially transmitted and corresponding data signals are programmed, and at least two first light emission periods during which the plurality of first pixels concurrently emit light according to the programmed data signals, wherein the second field comprises a second compensation period during which threshold voltages of driving transistors of the plurality of second pixels are concurrently compensated, a second scan period during which scan signals corresponding to the plurality of second pixels are sequentially transmitted and corresponding data signals are programmed, and at least two second light emission periods during which the plurality of second pixels concurrently emit light according to the programmed data signals, wherein, in sequential frames, the at least two first light emission periods and the at least two second light emission periods are alternately arranged such that two connection type light emission periods and separation type light emission periods are separated by a period that equals at least two light emission periods, and wherein a second scan period of a current frame is performed for the plurality of second pixels during a first one of the at least two first light emission periods that are separation type light emission periods, and a second scan period of a next frame of the current frame is performed for the plurality of second pixels during a second one of the at least two first light emission periods that are separation type light emission periods.

8. A display device configured to divide one frame into at least two fields and comprising a plurality of first pixels configured to emit light in a first field of the at least two fields and a plurality of second pixels configured to emit light in a second field of the at least two fields, wherein the first field comprises a first compensation period during which threshold voltages of driving transistors of the plurality of first pixels are concurrently compensated, a first scan period during which scan signals corresponding to the plurality of first pixels are sequentially transmitted and corresponding data signals are programmed, and at least two first light emission periods during which the plurality of first pixels concurrently emit light according to the programmed data signals, wherein the second field comprises a second compensation period during which threshold voltages of driving transistors of the plurality of second pixels are concurrently compensated, a second scan period during which scan signals corresponding to the plurality of second pixels are sequentially transmitted and corresponding data signals are programmed, and at least two second light emission periods during which the plurality of second pixels concurrently emit light according to the programmed data signals, wherein, in sequential frames, the at least two first light emission periods and the at least two second light emission periods are alternately arranged such that two connection type light emission periods and separation type light emission periods are separated by a period that equals at least two light emission periods, and wherein a first scan period of a current frame is performed for the plurality of first pixels during a first one of the at least two second light emission periods that are separation type light emission periods, and a first scan period of a next frame of the current frame is performed for the plurality of first pixels during a second one of the at least two second light emission periods that are separation type light emission periods.

9. The display device of claim 1, wherein the at least two first light emission periods and the at least two second light emission periods are not overlapped with each other.

10. The display device of claim 1, further comprising:

a data driver configured to generate a plurality of data signals of the plurality of first and second pixels and to transmit the generated data signals;

a scan driver configured to generate a plurality of scan signals that activate driving of the plurality of first and second pixels and to transmit the generated scan signals; and a power controller configured to control power source voltages supplied to the plurality of first pixels and the plurality of second pixels.

11. The display device of claim 1, wherein the plurality of first pixels comprises a plurality of first pixel rows of the first pixels arranged along a first direction and the plurality of second pixels comprises a plurality of second pixel rows of the second pixels arranged along the first direction, and the plurality of first pixel rows and the plurality of second pixel rows are alternately arranged along a second direction that is perpendicular to the first direction.

12. The display device of claim 1, wherein the plurality of first pixels and the plurality of second pixels are alternately arranged pixel-by-pixel along a first direction and a second direction that is perpendicular to the first direction.

13. The display device of claim 1, further comprising a compensation control signal unit configured to generate a compensation control signal having an on-voltage level of a compensation transistor included in each of the plurality of first pixels and the plurality of second pixels during the first compensation period and the second compensation period.

14. The display device of claim 13, wherein the scan signals respectively transmitted to the plurality of first pixels and the plurality of second pixels during the first and second compensation periods are transmitted at an on-voltage level of a switching transistor included in each of the plurality of first pixels and the plurality of second pixels.

15. The display device of claim 1, wherein a voltage level of a first power source voltage supplied to the plurality of first pixels during the at least two first light emission periods, is different from a voltage level of the first power source voltage supplied during other periods, excluding the at least two first light emission periods, and is higher than a voltage level of a second power source voltage supplied to a cathode of an organic light emitting diode of each of the plurality of first pixels.

16. The display device of claim 1, wherein a voltage level of a third power source voltage supplied to the plurality of second pixels during the at least two second light emission periods, is different from a voltage level of the third power source voltage supplied during other periods, excluding the at least two second light emission periods, and is higher than a voltage level of a fourth power source voltage supplied to a cathode of an organic light emitting diode of each of the plurality of second pixels.

17. The display device of claim 1, wherein the first field further comprises a first reset period for resetting an anode voltage of an organic light emitting diode of each of the plurality of first pixels, and the second field further comprises a second reset period for resetting an anode voltage of an organic light emitting diode of each of the plurality of second pixels.

18. The display device of claim 17, wherein a first power source voltage transmitted to the plurality of first pixels during the first reset period, is lower than a second power source voltage; and a third power source voltage transmitted to the plurality of second pixels during the second reset period, is lower than a fourth power source voltage.

19. The display device of claim 18, wherein voltages of the data signals supplied to the plurality of first pixels during the first reset period, have a level that makes an anode voltage reset to the first power source voltage supplied to the plurality of first pixels by a current flowing to a driving transistor of each of the plurality of first pixels; and voltages of the data signals supplied to the plurality of second pixels during the second reset period, have a level that makes an anode voltage reset to the third power source voltage supplied to the plurality of second pixels by a current flowing to a driving transistor of each of the plurality of second pixels.

20. A method for driving a display device dividing one frame into at least two fields and comprising a plurality of first pixels emitting light in a first field and a plurality of second pixels emitting light in a second field, the method comprising:

transmitting a plurality of first field data signals to the plurality of first pixels during a first scan period;

concurrently light emitting the plurality of first pixels during at least two first light emission periods comprising a light emission period at a beginning of a frame and a light emission period at an end of the frame separated from the light emission period at the beginning of the frame by a non-emission period of the plurality of first pixels according to the plurality of the first field data signals;

transmitting a plurality of second field data signals to the plurality of second pixels during a second scan period; and concurrently light emitting the plurality of second pixels during at least two second light emission periods comprising a light emission period at the non-emission period of the plurality of the first pixels according to the plurality of second field data signals, wherein the first field comprising the first scan period and the at least two first light emission periods and the second field comprising the second scan period and the at least two second light emission periods, are temporally distinct from each other.

21. The method for driving the display device of claim 20, wherein the at least two first light emission periods of the first field and the at least two second light emission periods of the second field do not overlap each other.

22. The method for driving the display device of claim 20, wherein the at least two first light emission periods are connection type light emission periods such that they are sequential, or separation type light emission periods such that they are separated from each other by a predetermined time, and the connection type light emission periods and the separation type light emission periods are repeated during sequential frames.

23. The method for driving the display device of claim 22, wherein the predetermined time equals a period that corresponds to the sum of the at least two second light emission periods.

24. The method for driving the display device of claim 20, wherein the at least two second light emission periods are connection type light emission periods such that they are sequential, or separation type light emission periods such that they are separated from each other by a predetermined time, and the connection type light emission periods and the separation type light emission periods are repeated during sequential frames.

25. The method for driving the display device of claim 24, wherein the predetermined time equals a period that corresponds to the sum of the at least two first light emission periods.

26. The method for driving the display device of claim 20, wherein the at least two first light emission periods and the at least two second light emission periods in sequential frames are alternately arranged such that connection type light emission periods and separation type light emission periods that are separated by a period corresponding to the sum of at least two light emission periods, are alternately arranged.

27. The method for driving the display device of claim 20, wherein a first one of the at least two first light emission periods is equal to or shorter than the second scan period for the plurality of second pixels, and a second one of the at least two first light emission periods is equal to or shorter than the second scan period of a next frame for the plurality of second pixels.

28. The method for driving the display device of claim 20, wherein a first one of the at least two second light emission periods is equal to or shorter than the first scan period for the plurality of first pixels, and a second one of the at least two second light emission periods is equal to or shorter than the first scan period of a next frame for the plurality of first pixels.

29. The method for driving the display device of claim 20, wherein a first period that is a period from a termination time point of the first scan period to a start time point of the at least two first light emission periods that are connection type light emission periods in a current frame, and a second period that is a period from a termination time point of the second scan period to a start time point of the at least two second light emission periods that are connection type light emission periods in a next frame that is adjacent to the current frame, are equivalent to each other.

30. The method for driving the display device of claim 20, wherein a third period that is a period from a termination time point of the first scan period to a start time point of the at least two first light emission periods that are separation type light emission periods in a current frame, and a fourth period that is a period from a terminal time point of the second scan period to a start time point of the at least two second light emission periods that are separation type light emission periods of a next frame that is adjacent to the current frame, are equivalent to each other.

31. The method for driving the display device of claim 30, wherein the third period and the fourth period equal a period that corresponds to the sum of a reset period during which anode voltages of organic light emitting diodes of the plurality of second pixels are reset and a compensation period during which threshold voltages of driving transistors of the plurality of first pixels and the plurality of second pixels are compensated.

32. The method for driving the display device of claim 20, wherein, before the first scan period, further comprising resetting an anode voltage of an organic light emitting diode of each of the plurality of first pixels and compensating a threshold voltage of a driving transistor of each of the plurality of first pixels and, before the second scan period, resetting an anode voltage of an organic light emitting diode of each of the plurality of second pixels and compensating a threshold voltage of a driving transistor of each of the plurality of second pixels.

33. A method for driving a display device comprising a plurality of pixels that comprises a plurality of organic light emitting diodes and a plurality of driving transistors that control a driving current supplied to each of the plurality of organic light emitting diodes, a first power source voltage, and a second power source voltage, the first and second power source voltages supplying driving voltages to the plurality of pixels, the method comprising:

during a first field:

resetting anode voltages of a plurality of first organic light emitting diodes of a plurality of first pixels included in a first pixel group among the plurality of pixels during a first reset period;

compensating threshold voltages of a plurality of first driving transistors of the plurality of first pixels during a first compensation period;

transmitting a data signal corresponding to each of the plurality of first driving transistors during a first scan period; and concurrently emitting light from the plurality of first organic light emitting diodes according to a plurality of driving currents controlled by the plurality of first driving transistors during at least two first light emission periods comprising a light emission period at a beginning of a frame and a light emission period at an end of the frame separated from the light emission period at the beginning of the frame by a non-emission period of the plurality of first organic light emitting diodes; and during a second field:

resetting an anode voltage of each of a plurality of second organic light emitting diodes of a plurality of second pixels included in a second pixel group among the plurality of pixels during a second reset period;

compensating a threshold voltage of each of a plurality of second driving transistors of the plurality of second pixels during a second compensation period;

transmitting a data signal corresponding to each of the plurality of second driving transistors during a second scan period; and concurrently emitting light from the plurality of second organic light emitting diodes according to a plurality of driving currents controlled by the plurality of second driving transistors during at least two second light emission periods comprising a light emission period at the non-emission period of the plurality of first organic light emitting diodes.

34. The method for driving the display device of claim 33, wherein a voltage level of the first power source voltage supplied to the plurality of first pixels included in the first pixel group during the at least two first light emission periods, is different from a voltage level of the first power source voltage supplied during other periods excluding the at least two first light emission periods; and a voltage level of the second power source voltage supplied to the plurality of first pixels included in the first pixel group during the first reset period, is different from a voltage level of the second power, source voltage during other periods excluding the first reset period.

35. The method for driving the display device of claim 33, wherein a voltage level of the first power source voltage supplied to the plurality of second pixels included in the second pixel group during the at least two second light emission periods, is different from a voltage level of the first power source voltage supplied during other periods excluding the at least two second light emission periods; and a voltage level of the second power source voltage supplied to the plurality of second pixels included in the second pixel group during the second reset period, is different from a voltage level of the second power source voltage during other periods excluding the second reset period.

36. The method for driving the display device of claim 33, wherein the at least two first light emission periods of the first field and the at least two second light emission periods of the second field are not overlapped with each other, the at least two first light emission periods and the second reset period are not overlapped with each other, and the at least two second light emission periods and the first reset period are not overlapped with each other.

37. The method for driving the display device of claim 33, wherein the first power source voltage transmitted to the plurality of first pixels during the first reset period, is lower than the second power source voltage transmitted to the plurality of first pixels; and the first power source voltage transmitted to the plurality of second pixels during the second reset period, is lower than the second power source voltage transmitted to the plurality of second pixels.

38. The method for driving the display device of claim 33, wherein a voltage of a data signal supplied to the plurality of first pixels during the first reset period, has a level that makes an anode voltage reset to the first power source voltage supplied to the plurality of first pixels by a current flowing to the plurality of first driving transistors; and a voltage of a data signal supplied to the plurality of second pixels during the second reset period, has a level that makes an anode voltage reset to the first power source voltage supplied to the plurality of second pixels by a current flowing to the plurality of second driving transistors.

* * * * *